(12) United States Patent
Hausrath et al.

(10) Patent No.: US 9,783,454 B2
(45) Date of Patent: Oct. 10, 2017

(54) HIGH STRENGTH GLASS COMPOSITION AND FIBERS

(75) Inventors: Robert L. Hausrath, Aiken, SC (US); Anthony V. Longobardo, Johnston, SC (US)

(73) Assignee: AGY Holding Corp., Aiken, SC (US)

( * ) Notice: Subject to any disclaimer, the term of this patent is extended or adjusted under 35 U.S.C. 154(b) by 0 days.

(21) Appl. No.: 12/976,261

(22) Filed: Dec. 22, 2010

(65) Prior Publication Data

US 2012/0163987 A1 Jun. 28, 2012

(51) Int. Cl.
*C03C 17/00* (2006.01)
*C03C 13/00* (2006.01)
*C03C 3/087* (2006.01)
*C08J 5/08* (2006.01)
*C08J 5/24* (2006.01)

(52) U.S. Cl.
CPC ............ *C03C 13/00* (2013.01); *C03C 3/087* (2013.01); *C08J 5/08* (2013.01); *C08J 5/24* (2013.01); *C08J 2300/24* (2013.01); *C08J 2363/00* (2013.01)

(58) Field of Classification Search
CPC ......... C03C 3/076; C03C 3/093; C03C 3/087; C03C 13/00; C03C 13/045; C03C 3/091; C03C 3/085
USPC ......... 501/69, 70, 11, 27, 35, 36, 55, 59, 72, 501/108, 105, 104, 100, 101, 123, 121, 501/118, 133, 135, 138, 153, 154
See application file for complete search history.

(56) References Cited

U.S. PATENT DOCUMENTS

| | | | |
|---|---|---|---|
| 3,887,386 A * | 6/1975 | Majumdar | C03C 3/04 106/711 |
| 6,846,855 B2 | 1/2005 | Campbell et al. | |
| 7,565,819 B2 | 7/2009 | Jeanvoine et al. | |
| 7,585,563 B2 | 9/2009 | Kashikar et al. | |
| 7,732,047 B2 | 6/2010 | Kashikar et al. | |
| 7,799,713 B2 | 9/2010 | Hoffmann et al. | |
| 7,823,417 B2 | 11/2010 | Hoffmann et al. | |
| 8,476,175 B2 * | 7/2013 | Lecomte | 501/36 |
| 2002/0162358 A1 | 11/2002 | Jeanvoine et al. | |
| 2002/0198301 A1 | 12/2002 | Campbell et al. | |
| 2005/0163998 A1 | 7/2005 | Kashikar et al. | |
| 2006/0000239 A1 | 1/2006 | Jeanvoine et al. | |
| 2006/0083922 A1 | 4/2006 | Kashikar et al. | |
| 2007/0087139 A1 | 4/2007 | Creux et al. | |
| 2007/0105701 A1 | 5/2007 | Hoffmann et al. | |
| 2008/0009403 A1 | 1/2008 | Hoffmann et al. | |
| 2009/0143214 A1 * | 6/2009 | Niida et al. | 501/56 |
| 2009/0305053 A1 | 12/2009 | Lecomte et al. | |
| 2010/0069220 A1 | 3/2010 | McGinnis et al. | |
| 2010/0129944 A1 * | 5/2010 | Shimada | C03C 3/087 438/27 |
| 2010/0160139 A1 | 6/2010 | McGinnis | |
| 2010/0162772 A1 * | 7/2010 | McGinnis et al. | 65/474 |
| 2010/0239840 A1 | 9/2010 | Kashikar et al. | |
| 2011/0000263 A1 | 1/2011 | Hoffmann et al. | |
| 2011/0003678 A1 | 1/2011 | Hofmann et al. | |
| 2012/0129678 A1 * | 5/2012 | Tang | 501/38 |
| 2012/0135849 A1 * | 5/2012 | Hoffman et al. | 501/38 |

FOREIGN PATENT DOCUMENTS

| | | | |
|---|---|---|---|
| CN | 101597140 | * | 12/2009 |
| JP | 2003-171143 | * | 6/2003 |
| JP | 2003-171143 A | | 6/2003 |
| KR | 10-2000-0076068 A | | 12/2000 |
| KR | 10-2006-0017862 A | | 2/2006 |
| KR | 10-2007-0074607 A | | 7/2007 |
| KR | 10-2008-0073715 A | | 8/2008 |

OTHER PUBLICATIONS

Korean Intellectual Property Office, PCT International Search Report and Written Opinion of the International Searching Authority for Patent Application No. PCT/US2010/061810 dated Sep. 16, 2011.

* cited by examiner

*Primary Examiner* — Camie Thompson
(74) *Attorney, Agent, or Firm* — Amy Allen Hinson; Nexsen Pruet, LLC

(57) ABSTRACT

Glass compositions and high-modulus, and high-strength glass fibers made therefrom, being capable of economical, continuous processing and suitable for the production of high-strength and/or high stiffness, low-weight composites, such as windturbine blades, the glass composition comprises the following constituents in the limits defined below, expressed as weight percentages: between about 56 to about 61 weight percent $SiO_2$; between about 16 to about 23 weight percent $Al_2O_3$, wherein the weight percent ratio of $SiO_2/Al_2O_3$ is between about 2 to about 4; between about 8 to about 12 weight percent MgO; between about 6 to about 10 weight percent CaO, wherein the weight percent ratio of MgO/CaO is between about 0.7 to about 1.5; between about 0 to about 2 weight percent $Na_2O$; less than about 1 weight percent $Li_2O$; and total residual transition metal oxides of less than about 2 weight percent.

22 Claims, No Drawings

HIGH STRENGTH GLASS COMPOSITION AND FIBERS

TECHNICAL FIELD

The present disclosure is generally directed to glass compositions, suitable for use in continuous manufacturing of high strength glass fibers, and specifically, fibers formed from the composition and composites thereof.

BACKGROUND

Currently there are a number of glass families designed for high strength and high modulus that are at least capable of forming fibers. For example, R-Glass and S-Glass are examples of such glass families, both of which have higher strength than boron-containing E-Glass. R-Glass is considered a high strength, high modulus glasses that is formable into fibers and useful in aerospace composite applications. R-Glass is typically composed of silicon oxide, aluminum oxide, magnesium oxide, and calcium oxide.

S-Glass is typically composed of silicon oxide, aluminum oxide and magnesium oxide (ASTM International (D578-05)). S-glass fibers have a slightly higher mechanical strength, in part from its higher silica content and less calcium oxide content than R-Glass fibers. The chemical composition of the S-glass family also provides for high strength glass fiber useful in high strength applications, such as ballistic armor. Deutsches Institutflir Normung (DIN) classifies S-Glass as an aluminosilicate glass (e.g., mostly aluminum trioxide and silicon dioxide) and having MgO at about 10% by weight (DIN 1259-1) without added CaO.

One drawback to the R-Glass and S-Glass families is that they require higher melting and processing temperatures during fiber forming than that of E-Glass, which requires that R-Glass and S-Glass be generally manufactured by melting the constituents of the compositions in specialized melter such as a platinum lined melter, thus raising the production costs of forming R-Glass and S-Glass fibers compared to E-Glass fibers. In addition, higher processing temperatures reduce the life of the fiber bushings, which are expensive to replace. Ideally, a continuous fiberization process utilizing a refractory lined melter and low fiber bushing temperatures would be desirable in combination with a high-strength glass composition.

SUMMARY

Glass compositions for the formation of continuous glass fibers that are suitable for use in high-strength applications and that are capable of being economically formed into glass fibers using low-cost, direct melting furnaces, are provided. The instant glass compositions exhibit low melting and fiberizing temperatures suitable for refractory-lined furnaces. The instant glass compositions combine these processing benefits with strength characteristics of higher-priced, more process restrictive glass fibers such as S-Glass and R-Glass.

Thus, in one embodiment, a composition comprising between about 56 to about 61 weight percent $SiO_2$; between about 16 to about 23 weight percent $Al_2O_3$, wherein the weight percent ratio of $SiO_2/Al_2O_3$ is between about 2 to about 4; between about 8.5 to about 11.5 weight percent MgO; between about 6 to about 10 weight percent CaO, wherein the weight percent ratio of MgO/CaO is between about 0.7 to about 1.5; between about 0 to about 2 weight percent $Na_2O$; less than about 1 weight percent $Li_2O$; and total residual transition metal oxides of less than about 2 weight percent, is provided. Glass fibers formed from the composition are also provided.

In one aspect, the glass composition comprises between about 57.5 to about 60.5 weight percent $SiO_2$; between about 17.3 to about 21.5 weight percent $Al_2O_3$, wherein the weight percent ratio of $SiO_2/Al_2O_3$ is between about 2.7 to about 3.5; between about 9.0 to about 11.3 weight percent MgO; between about 7.5 to about 9.7 weight percent CaO, wherein the weight percent ratio of MgO/CaO is between about 1.0 to about 1.2; between about 0 to about 2 weight percent $Na_2O$; less than about 0.5 weight percent $Li_2O$; and total residual transition metal oxides of less than about 2 weight percent. Glass fibers formed from the composition are also provided.

In another aspect, the weight percent of the four most abundant oxides present in the glass composition or fiber can be expressed as follows: $57 \leq SiO_2 \leq 60$; $17 \leq Al_2O_3 \leq 22$; $7 \leq MgO \leq 12$; $7 \leq CaO \leq 11.5$; $1 \leq Na_2O \leq 2$; and wherein the glass composition or fiber has the following oxide ratios: $2.7 \leq SiO_2/Al_2O_3 \leq 3.5$ by weight percent present, and $0.8 \leq MgO/CaO \leq 1.2$ by weight percent.

In another embodiment, a process for providing continuous, manufacturable, high modulus glass fibers in a glass melter is provided. The process comprises the steps of providing a composition to a melting zone of a glass melter, the composition comprising between about 56 to about 61 weight percent $SiO_2$; between about 16 to about 23 weight percent $Al_2O_3$, wherein the weight percent ratio of $SiO_2/Al_2O_3$ is between about 2 to about 4; between about 8 to about 12 weight percent MgO; between about 6 to about 10 weight percent CaO, wherein the weight percent ratio of MgO/CaO is between about 0.7 to about 1.5; between about 0 to about 2 weight percent $Na_2O$; less than about 1 weight percent $Li_2O$; and total residual transition metal oxides of less than about 2 weight percent; and heating the composition to a forming temperature in excess of the liquidus temperature of a resulting glass to form a fiberizable molten glass and continuously fiberizing said molten glass, whereby a manufacturable high modulus glass fiberization process is sustained.

In another embodiment, a fiberglass reinforced article is provided. The article comprises glass fibers of the composition described above and an organic, inorganic, or organic-inorganic matrix material.

DETAILED DESCRIPTION

The glasses disclosed and described herein are suitable for melting in traditional commercially available refractory-lined glass furnaces, which are widely used in the manufacture of glass reinforcement fibers. The mechanical properties and the effectiveness of composite parts are enhanced by improving the mechanical performance of glass fibers, especially the Young's modulus of the fibers.

As used herein, the term "liquidus" is given its ordinary and customary meaning, generally inclusive of the highest temperature at which equilibrium exists between liquid glass and its primary crystalline phase, whereas at all temperatures above the liquidus, the glass melt is free from crystals in its primary phase and at temperatures below the liquidus, crystals may form in the melt.

As used herein, the term "delta-T ($\Delta T$)" is given its ordinary and customary meaning, generally inclusive of the difference between the fiberizing temperature and the liquidus, and thus, a fiberizing property of the glass composition. The larger the delta-T, the greater degree of process flexibility during the formation of glass fibers and the less likely devitrification (formation of crystals within the melt) of the glass melt will occur during melting and fiberizing. Typically, the greater the delta-T, the lower the production cost of the glass fibers, in part by extending bushing life and by providing a wider fiber-forming process window.

As used herein, the phrase "essentially lithium free" refers to a composition whereas lithium oxides and or their precursors are not intentionally added to the composition, however trace amounts of lithium is tolerable, preferably less than 1 weight percent, more preferably less than 0.75 percent, even more preferably less than 0.5 percent. In one aspect, trace amounts of lithium is less than 0.25 weight percent.

As used herein, the phrase "essentially potassium free" refers to a composition where potassium oxides are not intentionally added to the composition, however trace amounts of potassium is tolerable, preferably less than 1 weight percent, more preferably less than 0.75 percent, even more preferably less than 0.5 percent. In one aspect, trace amounts of potassium is less than 0.25 weight percent. The phrase "essentially free," with reference to other oxides or substances, should be given the same meaning.

In one aspect, when the silicon dioxide in the composition for forming fibers is less than 56 weight percent, when the other components of the composition are taken into account, the viscosity of the glass becomes too low and there is an increased risk of devitrification during fiberizing. Above 61%, the glass becomes more viscous and more difficult to melt and fiberize. Preferably, the silica content is between about 56 and about 61 weight percent.

In one aspect, reducing the percentage concentration of aluminum oxide in the composition for forming fibers, when the other components of the composition are taken into account, to below 17 weight percent results in a reduction in the modulus, whereas too large an increase in the percentage concentration of aluminum oxide, e.g., to above 22 weight percent, may cause devitrification and melt viscosity increases. Preferably, therefore, the alumina content of the instant compositions is between about 16 to about 23 weight percent.

Advantageously, the ratio of the weight percent of the silica and alumina oxides ($SiO_2/Al_2O_3$) is between about 2 to about 4, preferably between about 2.7 and 3.5 in the composition for forming fibers, which makes it possible to achieve high modulus fibers, when the other components of the composition are taken into account.

Magnesia or magnesium oxide (MgO) is present in the instant composition and provides a viscosity reducing effect as well as improving the modulus of the glass. The preferred weight percent of MgO in the composition for forming fibers is between about 8 to about 12, more preferably between about 9 and about 11.3 weight percent, when the other components of the composition are taken into account.

Calcium oxide (CaO) is also present in the instant composition and is used to adjust the viscosity and to control the devitrification of the glasses composition during processing, among other things. The preferred weight percent of CaO in the composition for forming fibers is between about 7 and about 10 weight percent, preferably between about 7.8 to about 9.7, when the other components of the composition are taken into account, such as the amount of magnesium oxide. The CaO/MgO weight ratio has an influence on the modulus and on the liquidus temperature of the glass, and therefore, for a given alumina content, preferably, the MgO/CaO ratio varies from about 0.7 to about 1.5, more preferably, between about 1 to about 1.2.

The composition of the glass for providing high modulus fibers therefore, is at least in part, based on the relationship of $SiO_2/Al_2O_3$ and the MgO/CaO in weight percent. In one aspect, the combination of these parameters makes it possible to obtain high Young modulus values of about 90 GPa or more and greater than about 85 GPa for impregnated strand tensile modulus, for example, while still having good fiberizability. In certain aspects, the combination of these parameters makes it possible to obtain Young modulus values of about 92 GPa or more and about 90 GPa for impregnated strand tensile modulus.

Other alkaline-earth metal oxides, for example BaO and SrO, may be present in the glass composition as trace impurities, that is, they are not intentionally added, and thus, the total content of these oxides is kept below 2 weight percent, preferably below 1 weight percent, so as not to increase the density of the glass, which would have the effect of lowering the specific Young's modulus. Preferably, the composition contains essentially no BaO and SrO.

Lithium oxide ($Li_2O$) is generally believed to be essential for obtaining a high specific Young's modulus of glass fibers, where it has been reported to provide a substantial reduction in the working temperature at amounts above 3 weight percent, but at amounts below 1 weight percent, the reduction in working temperature is insufficient for fiberization. However, it has been found by Applicants that with the appropriate selection of oxides of silicon, aluminum, magnesium, calcium and sodium, that the instant compositions and fibers provide a high modulus glass can be obtained with essentially no lithium oxide added. Thus, the instant compositions and glass fibers preferably are essentially lithium free.

Boron oxide ($B_2O_3$) in the instant glass composition is present in a weight percent of less than 1%, preferably 0.5%. Boron is not intentionally added to the instant compositions. Any boron present in the final glass fibers will have come from raw material impurities. Thus, in one aspect, the instant compositions and glass fibers preferably are essentially boron free.

Titanium oxide acts as a viscosity reducer and helps to increase the specific Young's modulus. It may be present as an impurity (its content in the composition is then from 0 to about 1%) or it may be intentionally added. $TiO_2$, if present, typically comes as an impurity in conventional raw materials, which are the preferred raw materials for a standard refractory furnace. Its intentional addition requires the use of non-conventional raw materials that are more expensive. Preferably, the $TiO_2$ content is less than 1 weight percent.

In one aspect, $Na_2O$ is added to the glass composition herein disclosed in order to limit devitrification and reduce the viscosity of the glass. Preferably, the weight percent of $Na_2O$ is between 0 to about 2%, preferably about 0.7 to about 1.2. In one aspect, the instant glass composition is comprised of only appreciable amounts of a single alkali metal oxide (e.g., essentially no mixed alkali metal oxides, such as both $Na_2O$ and $K_2O$ being present, for example). Preferably, the composition contains less than 0.2 weight percent of a mixture of "mixed alkali metal oxides," specifically, the mixture of $Na_2O$ and $K_2O$.

Fluorine ($F_2$) may be present in the composition in order to help in glass melting and in fiberizing. However, its content is limited to about 0 to about 1 weight percent. Preferably, the instant composition is essentially free of fluoride.

Transition metal oxides (e.g., $Fe_2O_3$, zirconium oxide, and chromium oxide forms) are generally present as impurities in the instant composition or added at low levels as processing aids. In one aspect, the total weight percent of transition metal oxide added to the instant composition is preferably below 2, preferably less than about 1. These transition metal oxides are impurities in the raw materials that can be present in small amounts but are not intentionally added to the instant composition.

In one aspect, the glass is essentially free of any additional components other than silicon dioxide, aluminum oxide, magnesium oxide, calcium oxide, and sodium oxide, with a total amount of $TiO_2$, $Fe_2O_3$, $B_2O_3$, and MnO being less than 2 weight percent, with any other material present in an amount that would not materially affect the novel characteristics of the instant composition, such as its manufacturability and high strength and modulus.

Manufacturing

The disclosed and described processes relates to glass fibers, which can be obtained by mechanically attenuating streams of molten glass that flow out of orifices located in the base of a bushing, which is heated by resistance heating or other means. These glass fibers are intended especially for the production of meshes and fabrics used in composites having an organic and/or inorganic matrix.

The glasses disclosed and described herein are suitable for melting in traditional commercially available refractory-lined glass melters that are widely used in the manufacture of glass reinforcement fibers, in what is commonly called a direct-melt process. This is contrasted to prior art formulations, which were melted in a platinum lined melting container, since those prior art formulations typically do not have properties which are compatible with direct-melt processes.

The glass batch disclosed and described herein is melted, in some instances using a glass melting furnace made from appropriate refractory materials such as alumina, chromic oxide, silica, alumina-silica, zircon, zirconia-alumina-silica, or similar oxide based refractory materials. Often, such glass melting furnaces include one more bubblers and/or electrical boost electrodes. The bubblers and/or electrical boost electrodes increase the temperature of the bulk glass and increase the molten glass circulation under the batch cover.

Thus, the melted glass composition disclosed herein is delivered to a bushing assembly from a forehearth. The bushing includes a tip plate with a plurality of nozzles, each nozzle discharges a stream of molten glass, which are mechanically drawn to form continuous filaments.

Thus, glass fibers according to the instant disclosure are obtainable from the glasses of the composition described as above to provide a large number of streams of molten glass flowing out of a large number of orifices located in the base of one or more bushings that are attenuated into the form of one or more groups of continuous filaments and then these strands are combined into one or more fibers, which are collected on a moving support. This may be a rotating support, when the fibers are collected in the form of wound packages, or in the form of a support that moves translationally when the fibers are chopped by a device that also serves to draw them or when the fibers are sprayed by a device serving to draw them, so as to form a mat.

Having generally described this instant disclosure, a further understanding can be obtained by reference to certain specific examples illustrated below which are provided for purposes of illustration only and are not intended to be all inclusive or limiting unless otherwise specified.

EXAMPLES

The exemplary glasses listed in Tables 1-2 were prepared by melting in platinum crucibles or in a refractory melter. Mechanical and physical properties of the glass and fibers produced were measured. The units of measurement for the physical properties are: Liquidus temperature (° C.) and delta-T (° C.). Density (g/cm³) and Young's Modulus (GPa) were measured for representative glass samples, and in some cases, pristine fiber tensile strength (MPa) was also measured.

Fiberizing temperature was measured using a rotating spindle viscometer at a fiberizing viscosity of 1000 Poise denoted by $T_3$. The temperature at which glass viscosity is 100 poise ($T_2$) was also similarly measured. Typically, the glass temperature in a melter is between $T_2$ and $T_3$. Liquidus temperature was measured by placing a platinum container filled with glass in a thermal gradient furnace for about 24 hours. The greatest temperature at which crystals were present was considered the liquidus temperature denoted by $T_{liquidus}$. Young's modulus was measured using a sonic technique on an annealed bulk glass sample. Tensile strength was measured on a pristine single fiber.

The following examples illustrate the exemplary fibers without limitation.

Glass fibers made up of glass filaments of about 10 micron in diameter were obtained by attenuating molten glass having the composition given in Tables 1-2, expressed in percentages by weight or ratios of percent by weight. Examples 11 and 12 have compositions having an amount of MgO that is less than that of CaO (MgO/CaO<1) that provided the lowest delta-T values and highest liquidus temperatures of the instant compositions.

TABLE 1

| Composition | Example | | | | | |
| --- | --- | --- | --- | --- | --- | --- |
| | 1 | 2 | 3 | 4 | 5 | 6 |
| $SiO_2$ | 59.87 | 59.86 | 59.85 | 59.85 | 58.62 | 58.61 |
| $Al_2O_3$ | 21.53 | 19.95 | 18.53 | 17.35 | 21.20 | 21.20 |
| MgO | 9.08 | 9.93 | 10.67 | 11.31 | 10.14 | 9.92 |
| CaO | 7.80 | 8.53 | 9.19 | 9.73 | 8.74 | 8.54 |
| $Na_2O$ | 1.50 | 1.50 | 1.50 | 1.50 | 1.07 | 1.50 |
| $TiO_2$ | 0.03 | 0.03 | 0.03 | 0.03 | 0.03 | 0.03 |
| $Fe_2O_3$ | 0.16 | 0.17 | 0.18 | 0.19 | 0.18 | 0.17 |
| $SiO_2/Al_2O_3$ | 2.78 | 3.00 | 3.23 | 3.45 | 2.77 | 2.76 |
| MgO/CaO | 1.16 | 1.16 | 1.16 | 1.16 | 1.16 | 1.16 |
| $T_2$ (° C.) | 1577 | 1546 | 1520 | 1501 | 1524 | 1529 |
| $T_3$ (° C.) | 1372 | 1345 | 1320 | 1305 | 1333 | 1334 |
| $T_{liquidus}$ (° C.) | 1260 | 1241 | 1240 | 1252 | 1257 | 1264 |
| $\Delta T$ (° C.) | 112 | 104 | 80 | 53 | 76 | 70 |
| Density (g/cm³) | 2.57 | 2.58 | 2.60 | 2.61 | 2.60 | 2.60 |
| Young's modulus (GPa) | 92.4 | 93.2 | 94.5 | 94.9 | 94.9 | 94.6 |
| Pristine tensile strength (MPa) | — | — | — | — | 4536 | — |

TABLE 2

| Composition | Examples | | | | | | Comparative Example 1 |
|---|---|---|---|---|---|---|---|
| | 7 | 8 | 9 | 10 | 11 | 12 | |
| $SiO_2$ | 58.61 | 58.30 | 58.02 | 57.95 | 58.61 | 58.05 | 60.0 |
| $Al_2O_3$ | 21.19 | 21.08 | 21.01 | 20.97 | 21.19 | 20.99 | 25.0 |
| MgO | 9.44 | 10.14 | 10.05 | 10.03 | 8.73 | 7.83 | 6.0 |
| CaO | 9.44 | 8.74 | 8.69 | 8.64 | 10.13 | 10.92 | 9.0 |
| $Na_2O$ | 1.07 | 1.50 | 1.07 | 1.07 | 1.07 | 1.07 | — |
| $TiO_2$ | 0.03 | 0.03 | 0.83 | 0.83 | 0.03 | 0.83 | — |
| $Fe_2O_3$ | 0.19 | 0.18 | 0.32 | 0.47 | 0.20 | 0.31 | — |
| $SiO_2/Al_2O_3$ | 2.77 | 2.77 | 2.76 | 2.76 | 2.77 | 2.77 | 2.4 |
| MgO/CaO | 1.00 | 1.16 | 1.16 | 1.16 | 0.86 | 0.72 | 0.67 |
| $T_2$ (° C.) | 1531 | 1524 | 1512 | — | 1538 | 1533 | — |
| $T_3$ (° C.) | 1338 | 1330 | 1326 | — | 1344 | 1341 | 1410 |
| $T_{liquidus}$ (° C.) | 1268 | 1265 | 1250 | — | 1291 | 1298 | 1330 |
| $\Delta T$ (° C.) | 70 | 65 | 76 | — | 53 | 43 | 80 |
| Density (g/cm³) | 2.59 | 2.59 | 2.60 | — | 2.59 | 2.60 | 2.56 |
| Young's modulus (GPa) | 94.3 | 94.2 | 95.1 | — | 93.8 | 93.0 | 94.1 |
| Pristine tensile strength (MPa) | — | — | — | — | — | — | 4764 |

Tables 1-2 show that the instant examples exhibit an excellent balance between melting and fiberizing properties and mechanical properties. These fiberizing properties are particularly advantageous for processing fibers, at least in part in view of the liquidus temperatures (about 1240° C. to 1270° C.), which are lower than that of R-glass (Comparative Example 1) and S-glass. The fiberizing window (ΔT) of all Examples is positive and substantial, and is equal to or greater than 60° C. (Example 9), 70° C. or greater (Examples 5-8, 10) or 80° C. (Example 3) or greater than 100° C. (Examples 1-2).

The properties of the glass reinforcement fibers (discussed below) are mainly governed by the composition of their constituent glass. The instant glass compositions provide fibers having substantially comparable mechanical properties, especially Young's modulus, than those of R-glass, while appreciably lowering the fiberizing temperature. The fibers disclosed and described herein have superior modulus and strength characteristics that are imparted to composites. The instant glass fiber examples 1-12 of Tables 1 and 2 have a measured modulus of between about 92 to about 95 GPa. The measured strength of an exemplary instant glass fiber (Example 5) was found to be about 657 KPsi (4536 MPa). Compared to R-Glass (Comparative Example 1), for example, the instant glass fibers have a lower $T_3$ yet possess excellent modulus and strength.

As apparent from the above examples, glass fiber compositions of the instant disclosure have advantageous properties, such as low fiberizing temperatures and wide differences between the liquidus temperatures and the fiberizing temperatures (high delta-T values). Other advantages and obvious modifications of the instant disclosure will be apparent to the artisan from the above description and further through practice of the instant disclosure. The high-performance glass disclosed and described herein melts and refines at relatively low temperatures, has a workable viscosity over a wide range of relatively low temperatures, and a low liquidus temperature range.

The above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 1 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the instant disclosure or they may be processing aids that are essentially removed during manufacture.

Composites

The instant disclosure also includes a composite comprising the aforementioned glass fibers formed from the compositions, as described above. Thus, a composite, comprising the glass fibers as described above in combination with a curable matrix material, is provided. In one aspect, the composite is configured for applications where high strength and stiffness and low weight are desired and/or required. Applications suitable for the instant composite comprising the glass fibers as described above in combination with an organic, inorganic, or organic-inorganic matrix material, include, for example, civilian and military transportation (e.g., aerospace vehicles, military combat and tactical vehicles, civilian personal and public transportation vehicles, etc., wind energy (such as wind turbine blades), reinforcements for the construction industry (cement boards), window screening, etc.), and the like. In other aspects, the glass fibers as described above in combination with an organic, inorganic, or organic-inorganic matrix material are applicable for any application where a light weight, stiff and high strength composite article is desired.

Suitable curable matrix materials include thermoset and thermoplastic resins. By way of example, suitable organic, inorganic, or organic-inorganic matrix materials include cements, ceramics, natural and synthetic rubbers, vinyl esters, polyesters, epoxy resin, polyurethanes, acrylic resins, and combinations or copolymers thereof. The organic matrix can be a thermoplastic or a thermoset material. Composite articles comprising the instant invention can be manufactured using any suitable composite fabrication technique, for example vacuum-assisted resin infusion or pre-impregnated reinforcement lay-up, resin transfer molding, compression molding, pultrusion, etc.

In one aspect of the instant disclosure, after the glass filaments are pulled and attenuated, sizing is applied, using conventional techniques. After the sizing is applied, the resulting fibers are collected into a roving, which is then wound into a package, e.g., using a conventional winder. In one aspect, the sizing composition is particularly suited for the high-temperature glass fibers, providing protection from abrasion during processing and to help facilitate the wetting of the coated fibers by a liquid material which will cure or set to form a solid resinous matrix in which the fibers are embedded as reinforcing elements, preferably enhancing the coupling between the cured resinous matrix and the glass fibers.

A roving comprising fibers made according to the instant disclosure was treated with a proprietary sizing composition and impregnated with an epoxy resin (Hexion L135 manufactured by Hexion, Inc.) and cured with Hexion LH137 according to the manufacturer's instructions. Impregnating the glass fiber produced from the compositions disclosed and described herein provides for glass fibers having an impregnated strand tensile modulus of about 85 GPa, greater than 87 GPa, greater than 89 GPa, and 90 GPa or greater. In one example, an exemplary impregnated strand (Example 5) was tested as specified in ASTM D2343 to determine its tensile strength and modulus. The data in Table 3 demonstrates the improved strength and modulus of an impregnated strand composite using the glass fiber compositions disclosed herein.

TABLE 3

| Impregnated Strand testing per ASTM D2343. | |
| --- | --- |
| Fiber Diameter (um) | 14 |
| Tensile Strength (MPa) | 3070 |
| Tensile Modulus (GPa) | 90 |

The above has been described both generically and with regard to specific embodiments. Although the instant disclosure has been set forth in what is believed to be the preferred embodiments, a wide variety of alternatives known to those of skill in the art can be selected within the generic disclosure. Other advantages and obvious modifications of the instant disclosure will be apparent to the artisan from the above description and further through practice of the instant disclosure. The instant disclosure is not otherwise limited, except for the recitation of the claims set forth below.

We claim:

1. A glass composition comprising:
   between 56 to 59.87 weight percent $SiO_2$;
   between 20.97 to 23 weight percent $Al_2O_3$, wherein the weight percent ratio of $SiO_2/Al_2O_3$ is between 2 to 4;
   between 8 to 12 weight percent MgO;
   between 6 to 10 weight percent CaO; wherein the weight percent ratio of MgO/CaO is between 0.7 to 1.5;
   between 0 to 2 weight percent $Na_2O$;
   less than 1 weight percent $TiO_2$;
   less than 1 weight percent $B_2O_3$;
   essentially free of intentionally added $Li_2O$; and
   total residual transition metal oxides of less than 2 weight percent.

2. The glass composition of claim 1, wherein the glass composition is less than 0.25 weight percent unintentionally added $Li_2O$.

3. The glass composition of claim 1, wherein the glass composition is essentially potassium free.

4. The glass composition of claim 1, wherein the glass composition is essentially lithium free and potassium free.

5. The glass composition of claim 1, wherein the glass composition has a liquidus temperature of between 1240° C. and 1270° C. and a $T_2$ of less than 1550° C.

6. A glass fiber comprising:
   between 56 to 59.87 weight percent $SiO_2$;
   between 20.97 to 23 weight percent $Al_2O_3$, wherein the weight percent ratio of $SiO_2/Al_2O_3$ is between 2 to 4;
   between 8 to 12 weight percent MgO;
   between 6 to 10 weight percent CaO, wherein the weight percent ratio of MgO/CaO is between 0.7 to 1.5;
   between 0 to 2 weight percent $Na_2O$;
   less than 1 weight percent $TiO_2$;
   less than 1 weight percent $B_2O_3$;
   essentially free of intentionally added $Li_2O$; and
   total residual transition metal oxides of less than 2 weight percent.

7. The glass fiber of claim 6, wherein the glass fiber is essentially potassium free.

8. The glass fiber of claim 6, wherein the glass fiber is less than 0.25 weight percent unintentionally added $Li_2O$ and potassium free.

9. The glass fiber of claim 6, wherein the glass fiber has a pristine fiber strength of at least 4400 MPa.

10. The glass fiber of claim 6, wherein the glass fiber has a Young's modulus of at least 90 GPa.

11. The glass fiber of claim 6, consisting essentially of:
    between 56 to 59.87 weight percent $SiO_2$;
    between 20.97 to 23 weight percent $Al_2O_3$, wherein the weight percent ratio of $SiO_2/Al_2O_3$ is between 2 to 4;
    between 8 to 12 weight percent MgO;
    between 6 to 10 weight percent CaO, wherein the weight percent ratio of MgO/CaO is between 0.7 to 1.5;
    between 0 to 2 weight percent $Na_2O$;
    less than 1 weight percent $TiO_2$;
    less than 1 weight percent $B_2O_3$;
    essentially free of intentionally added $Li_2O$; and
    total residual transition metal oxides of less than 2 weight percent.

12. A process for providing continuous, manufacturable, high modulus glass fibers in a glass melter, the process comprising the steps of:
    providing a composition to a melting zone of a glass melter, the composition comprising:
       between 56 to 59.87 weight percent $SiO_2$;
       between 20.97 to 23 weight percent $Al_2O_3$, wherein the weight percent ratio of $SiO_2/Al_2O_3$ is between 2 to 4;
       between 8 to 12 weight percent MgO;
       between 6 to 10 weight percent CaO; wherein the weight percent ratio of MgO/CaO is between 0.7 to 1.5;
       between 0 to 2 weight percent $Na_2O$;
       less than 1 weight percent $TiO_2$;
       less than 1 weight percent $B_2O_3$;
       less than 0.25 weight percent unintentionally added $Li_2O$; and
       total residual transition metal oxides of less than 2 weight percent;
    heating the composition to a forming temperature in excess of the liquidus temperature of a resulting glass to form a fiberizable molten glass; and continuously fiberizing said molten glass wherein a manufacturable high modulus glass fiberization process is sustained.

13. The process of claim 12, wherein the composition comprises between 56 to 59.87 weight percent $SiO_2$; between 20.97 to 23 weight percent $Al_2O_3$, wherein the weight percent ratio of $SiO_2/Al_2O_3$ is between 2 to 4; between 8 to 12 weight percent MgO; between 6 to 10 weight percent CaO, wherein the weight percent ratio of MgO/CaO is between 0.7 to 1.5; between 0 to 2 weight percent $Na_2O$; less than 1 weight percent $TiO_2$; less than 1 weight percent $B_2O_3$; less than 0.25 weight percent unintentionally added $Li_2O$; and total residual transition metal oxides of less than 2 weight percent.

14. The process of claim 12, wherein the composition has a fiberizing temperature of less than 1375° C., and a delta-T (ΔT) of at least 70° C.

15. The process of claim 12, wherein the glass fiber produced from said composition has a pristine fiber strength of at least 4400 MPa.

16. The process of claim 12, further comprising impregnating the glass fiber produced from said composition, wherein the glass fiber has an impregnated strand tensile modulus of greater than 85 GPa.

17. The process of claim 12, further comprising impregnating the glass fiber produced from said composition, wherein the glass fiber has an impregnated strand tensile modulus of 90 GPa.

18. A fiberglass reinforced article comprising:
   glass fibers comprising:
      between 56 to 59.87 weight percent $SiO_2$;
      between 20.97 to 23 weight percent $Al_2O_3$, wherein the weight percent ratio of $SiO_2/Al_2O_3$ is between 2 to 4;
      between 8 to 12 weight percent MgO;
      between 6 to 10 weight percent CaO, wherein the weight percent ratio of MgO/CaO is between 0.7 to 1.5;
      between 0 to 2 weight percent $Na_2O$;
      less than 1 weight percent $TiO_2$;
      less than 1 weight percent $B_2O_3$;
      essentially free of intentionally added $Li_2O$; and
      total residual transition metal oxides of less than 2 weight percent; and
   a matrix material.

19. The fiberglass reinforced article of claim 18, wherein the glass fibers comprise between 56 to 59.87 weight percent $SiO_2$; between 20.97 to 23 weight percent $Al_2O_3$, wherein the weight percent ratio of $SiO_2/Al_2O_3$ is between 2 to 4; between 8 to 12 weight percent MgO; between 6 to 10 weight percent CaO, wherein the weight percent ratio of MgO/CaO is between 0.7 to 1.5; between 0 to 2 weight percent $Na_2O$; less than 1 weight percent $TiO_2$; less than 1 weight percent $B_2O_3$; less than 0.25 weight percent unintentionally added $Li_2O$; and total residual transition metal oxides of less than 2 weight percent.

20. The fiberglass reinforced article of claim 18, wherein said fiberglass reinforced article is a wind turbine blade.

21. The fiberglass reinforced article of claim 18, wherein the glass fibers of the fiberglass reinforced article have an impregnated strand tensile modulus of greater than 85 GPa.

22. The fiberglass reinforced article of claim 18, wherein the glass fibers of the fiberglass reinforced article have an impregnated strand tensile modulus of 90 GPa.

* * * * *